(12) United States Patent
Rabello

(10) Patent No.: US 7,044,080 B2
(45) Date of Patent: May 16, 2006

(54) DOG LEASH HANDLE

(76) Inventor: Billy Rabello, 1028 W. 15th St., San Pedro, CA (US) 90731

( * ) Notice: Subject to any disclaimer, the term of this patent is extended or adjusted under 35 U.S.C. 154(b) by 0 days.

(21) Appl. No.: 10/691,892

(22) Filed: Oct. 23, 2003

(65) Prior Publication Data

US 2005/0087148 A1    Apr. 28, 2005

(51) Int. Cl.
*A01K 1/10*    (2006.01)
(52) U.S. Cl. .................. 119/61.56; 119/795; 119/51.01
(58) Field of Classification Search ................ 119/795, 119/796, 51.01, 61.5, 61.54, 61.56
See application file for complete search history.

(56) References Cited

U.S. PATENT DOCUMENTS 5,752,464 A * 5/1998 King et al. .................... 119/63
5,890,456 A * 4/1999 Tancrede ..................... 119/794
6,314,917 B1 * 11/2001 Ryan ........................... 119/796
6,443,096 B1 * 9/2002 Prydie ..................... 119/61.56
2002/0083900 A1 * 7/2002 Williams .................. 119/51.01
2003/0154931 A1 * 8/2003 Ostrowiecki ................ 119/796

* cited by examiner

*Primary Examiner*—Robert P. Swiatek
*Assistant Examiner*—Kimberly S. Smith
(74) *Attorney, Agent, or Firm*—Marcia A. Devon

(57) ABSTRACT

The invention is a multi-compartmented dog leash handle assembly. The handle assembly has a compartment capable of carrying keys, money and/or plastic waste bags. The handle also has provisions for the easy transport of dog food and water. The handle also has a mechanism for attaching to the loop handle of a typical dog leash. It is submitted with the understanding that it will not be used to interpret or limit the scope or meaning of the claims.

1 Claim, 3 Drawing Sheets

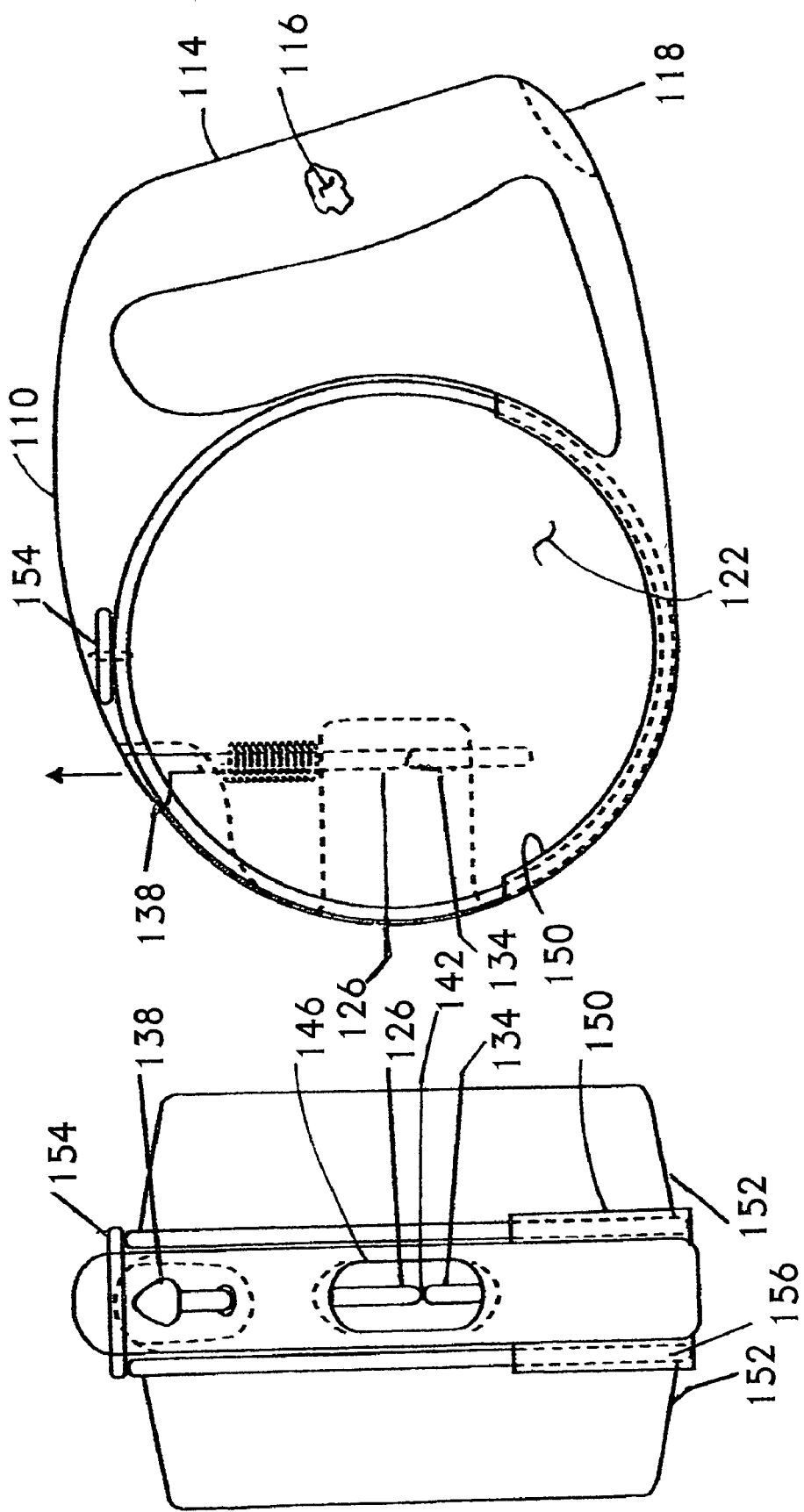

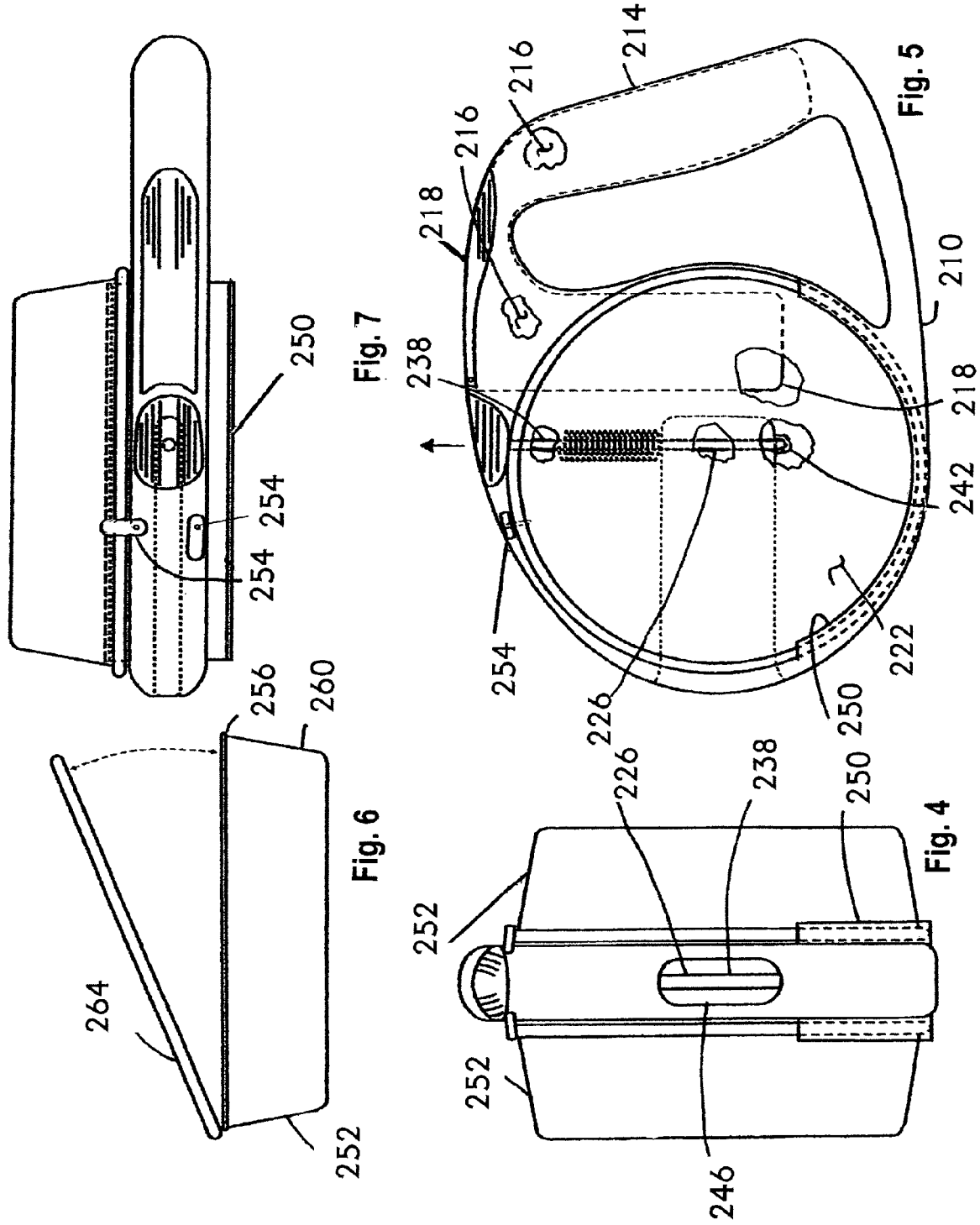

DOG LEASH HANDLE

BACKGROUND OF THE INVENTION

1. Field of Invention

This invention pertains particularly to a dog leash handle with compartments for storage, a food dish and a water dish.

2. Background Information

The increasing popularity of dogs in urban population centers effectively require pet owners to walk the pets in public places. Walking the dog is often the only exercise the pet and the owner get on a daily basis. The owner must carry a number of supplies during these walks to satisfy their needs as well as the needs of the dog and society. Pet owners typically carry plastic waste disposal bags, keys, money, the dog leash and pet supplies such as water and food. This forces the pet owner to carefully organize these supplies prior to departure and to juggle them during the walk.

Local ordinances often require that pet owners pick up the solid waste left by their dog. Pet owners typically use plastic bags to pick up the waste. The pet owner must remember to carry an ample supply of bags when they begin their walk. The ease, convenience and economy with which the litter may be handled in a clean and sanitary manner directly affects the willingness of pet owners to retrieve and properly dispose of their pet's waste. Disposal of the bagged waste adds another significant item to those already carried by the owner.

Many owners would like to provide their dogs with some food and water particularly during longer walks or hiking. The owner must carry the food and water and the dishes necessary for dispensing the food.

Athletic ware and other comfortable walking clothes often have no reliable way to carry loose items such as money or keys. This forces the owner to carry these items in their hands. Carrying additional items such as lip balm, a whistle and/or pepper spray greatly increases the burden on the owner.

BRIEF SUMMARY OF THE INVENTION

The invention is a multi-compartmented dog leash handle assembly. The handle assembly has a compartment capable of carrying keys, money and/or plastic waste bags. The handle also has provisions for the easy transport of dog food and water. The handle also has a mechanism for attaching to the loop handle of a typical dog leash.

Plastic waste disposal bags can be stored in a compartment within a hollow portion in the handle assembly. The compartment can be filled with plastic bags detachably connected end to end or individual bags such as plastic grocery bags.

A water dish and a food dish are removably attached to the outer surface of the casing of the handle assembly. Either or both dishes are held fast until released. The container also functions as serving dish. The open is large enough to allow the dog easy access and permit quick clean up. The contents of the container are held in place by a removable lid.

Keys and/or money and other items can be carried in the compartment.

The owner can now carry several items in the same hand as the leash. The many storage compartments and containers provide the owner with a reliable transportation device freeing them from the need to juggle several items during their walk.

The foregoing has outlined the more pertinent and important features of the present invention. Additional features of the present invention will be described hereinafter, which form the subject of the claims. It should be appreciated by those skilled in the art that the disclosed specific embodiment might be readily utilized as a basis for modifying or designing other structures and methods for carrying out the same purposes of the present invention. It also should be realized by those skilled in the art that such equivalent constructions and methods do not depart from the spirit and scope of the inventions as set forth in the appended claims.

BRIEF DESCRIPTION OF THE DRAWINGS

The invention will be more fully understood by reference to the following drawings that are for illustrative purposes only:

FIG. 2 is a front view of a second embodiment;

FIG. 3 is a side view of a second embodiment;

FIG. 4 is a front view of a third embodiment;

FIG. 5 is a side view of a third embodiment;

FIG. 6 is a side view of a container; and

FIG. 7 is a plan view of a third embodiment.

DETAILED DESCRIPTION

Figure 1:
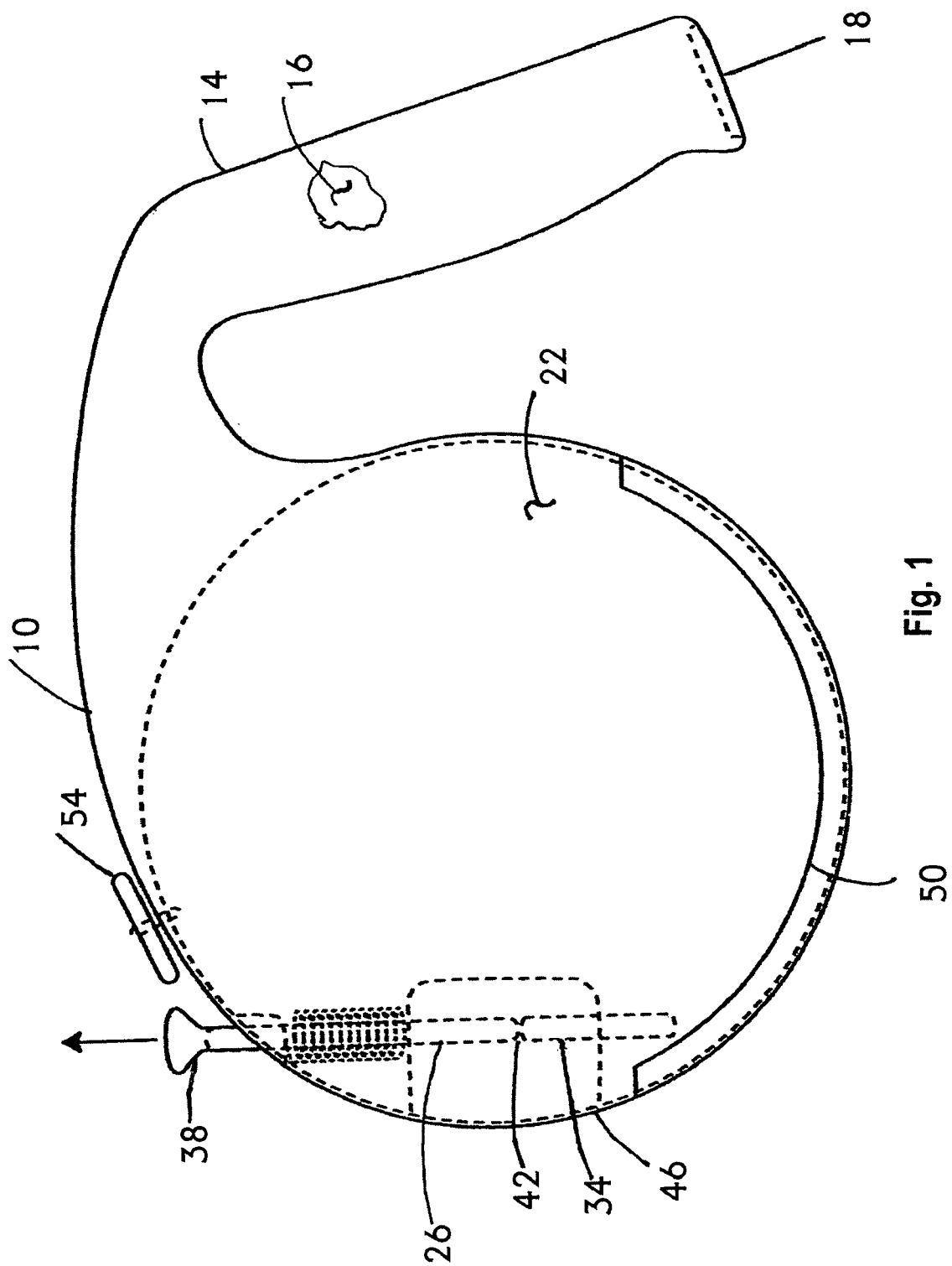
FIG. 1 is a side view of an embodiment.

A multi-compartmented dog leash handle assembly is disclosed in FIG. 1 which may be attached to a conventional dog leash. The handle assembly contains inside compartments suitable for carrying keys, money and/or plastic waste disposal bags. The handle assembly has containers intended for the easy transport of dog food and water. The handle also has a mechanism for attaching to the loop handle of a typical dog leash. Alternatively, in another preferred embodiment (not shown), the leash, the housing with the removably attached containers and the handle are all one integrated unit, including an optional, additional storage compartment within the hollow handle.

FIG. 1 depicts a side view of an embodiment of the assembly 10 without the food/water container attached. At least one compartment 22 is provided which covers the leash attachment mechanism 26. In the preferred embodiment there are two outside compartments on each side of the handle assembly. The mechanism 26 has a vertically aligned fixed pin 34 mounted in the lower front portion of the compartment 22. A spring-loaded pin 38 abuts 42 the top end of the fixed pin 34. The centerline of the spring-loaded pin 38 and the fixed pin 34 coincide. The leash assembly may be installed by inserting the loop handle (not shown) of a conventional leash (which is usually held by the dog owner). The loop is inserted through the opening in the forward facing end 46 of the first compartment 22, retracting the spring-loaded pin 38 enough to allow the loop handle to pass under it and then fully extending the spring-loaded pin 38 to abut against the fixed pin 34 to retain the loop handle.

In the preferred embodiment, the hollow grip 14 defines an interior storage compartment 16. The hollow grip 14 is attached to the back end of the first compartment 22 and is suitable for storing keys, money and/or plastic waste disposal bags. The compartment can be filled with plastic bags detachably connected end to end or individual bags such as grocery bags. A lid 18, located at the base of the grip 14 or on its side or at its top, affords easy entry to the storage compartment 16.

The outer surface of the first compartment 22 has an acruate retaining flange 50. Removable containers 252 are provided as shown in FIG. 6. Each container 252 has a perimeter lip 256 on the rim of the dish. Each container may have an air and watertight removable lid. A rotating latch 54 is mounted on the top of the first compartment 22 to secure the container to the compartment 22. The attachment process includes sliding the lip under the edge of the flange 50 and rotating the latch 54 to secure the container in place. The container also functions as serving dish. The opening of the container is large enough to allow the dog easy access and to permit quick clean up.

FIGS. 2 and 3 depict another embodiment of the device 110. The compartment 122 covers the leash attachment mechanism 126. The mechanism 126 has a vertically aligned fixed pin 134 mounted in the lower front portion of the compartment 122. A spring-loaded pin 138 abuts 142 the top end of the fixed pin 134. The centerline of the spring-loaded pin 138 and the fixed pin 134 coincide. Leash installation consists of inserting the loop handle of a typical leash through the opening in the forward facing end 146 of the first compartment 122, retracting the spring-loaded pin 138 enough to allow the loop handle to pass under it and then fully extending the spring-loaded pin 138 to abut against the fixed pin 134 to retain the loop handle.

In this embodiment, the hollow grip 114 defines the storage compartment 116. Attached to the back end of the first compartment 122, the hollow grip 114 is suitable for storing keys, money and/or plastic waste disposal bags. The compartment can be filled with plastic bags detachably connected end to end or individual bags such as grocery bags. A lid 118, located at the base of the grip 114 or on its side or at its top, affords easy entry to the storage compartment 116 and secures the items placed inside.

The outer surface of the first compartment 122 has an arcuate or semi-circular shaped retaining flange 150. Each container 152 has a perimeter lip 156 formed outward from the rim of the dish. Each container 152 has an air and watertight removable lid. Mounted on the top of the first compartment 122 is a rotating latch 154. When attached to the handle assembly 110, the containers 152 sandwich the first compartment 122. The attachment process includes sliding the lip 156 under the edge of the flange 150 and rotating the latch 154 to secure the container 152 in place. However, it will be appreciated that a number of different types of conventional fasteners may be used to removable attach the container to the outer surface of the housing. The container 152 also functions as serving dish. The container opening is large enough to allow the dog easy access and permit quick clean up.

FIGS. 4, 5, 6 and 7 depict another embodiment of the device 210 which includes a hole 242 to receive and secure the spring-loaded 238 pin after it is inserted through the loop handle of the leash. The first compartment 222 covers the leash attachment mechanism 226. The mechanism 226 has a vertically aligned spring-loaded pin 238. The end of the spring-loaded pin 238 engages a receiver hole when fully extended. The centerline of the receiver hole 242 and the centerline of the spring-loaded pin 238 coincide. Installation of the leash assembly of the present invention includes inserting the loop handle of a typical leash through the opening in the forward facing end 246 of the first compartment 222, retracting the spring-loaded pin 238 enough to allow the loop handle to pass under it and then fully extending the spring-loaded pin 238 back into the receiver hole 242 to retain the loop handle.

In the preferred embodiment, the hollow grip 214 and the back end of the first compartment 222 define a contiguous storage compartment 216. A partition 218 separates the storage compartment 216 from the leash attachment mechanism 226. Attached to the back end of the first compartment 222, the storage compartment 216 is suitable for storing keys, money and/or plastic waste disposal bags. The compartment 216 can be filled with plastic bags detachably connected end to end or individual bags such as grocery bags. A lid 218, located at the base of the grip or on its side or at its top 214, affords easy entry to the storage compartment 216.

The outer surface of the first compartment 222 has a semi-circle shaped retaining flange 250. Each container 252 has a perimeter lip 256 extending outward from the rim of the dish 260. Each container 252 has an air and watertight removable lid 264. Mounted on the top of the first compartment 222 is a rotating latch 254. When attached to the handle assembly 210, the containers 252 sandwich the first compartment 222. The attachment process includes sliding the lip 256 under the edge of the flange 250 and rotating the latch 254 to secure the container 252 in place. The container 252 also functions as serving dish. The opening is large enough to allow the dog easy access and permit quick clean up.

A retractable leash mechanism can replace leash attachment mechanism in the first compartment of each embodiment. The retractable leash mechanism has a biased reel installed with its axel perpendicular to the outer surface of the first compartment at the container attachment point. The attached leash can extend or retract relative to the first compartment.

The storage compartment and/or the lid can be transparent in each embodiment. This would allow an internal view of the contents of the storage compartment.

The present disclosure includes that contained in the present claims as well as that of the foregoing description. Although this invention has been described in its preferred forms with a certain degree of particularity, it is understood that the present disclosure of the preferred forms has been made only by way of example and numerous changes in the details of construction and combination and arrangement of parts may be resorted to without departing from the spirit and scope of the invention. Accordingly, the scope of the invention should be determined not only by the embodiments illustrated, but by the appended claims and their legal equivalents.

What is claimed is:

1. A leash handle assembly comprising:
   a housing forming a hollow grip;
   a leash retainer mechanism within said housing;
   a first compartment receiving said leash retainer mechanism, said first compartment having a forward-facing end and a backward facing end;
   a storage compartment having at top end and a forward facing end, said storage compartment formed within said hollow grip, said backward facing end of said first compartment being joined to said forward facing end of said storage compartment, said leash attachment mechanism being partitioned from said storage compartment, and said storage compartment having an outer surface, the joined said first compartment and said storage compartment having a first side and a second side;
   a first opening in said forward facing end of said first compartment;
   a second opening into said storage compartment through said top end;
   a first container and first container retaining mechanism, said first container retaining mechanism mounted onto said outer surface of said first side of said compartment; and
   a second container and a second container retaining mechanism, wherein said first and second container retaining mechanisms include a flange to engage said perimeter lip of either said containers, a rotating latch being mounted on said outer surface of said first side and said second side located opposite from said flange at a distance equal to the outer diameter of said lip.

* * * * *